Patented Apr. 15, 1941

2,238,165

UNITED STATES PATENT OFFICE 2,238,165

MANUFACTURE OF TEXTILE AND LIKE MATERIALS

George Holland Ellis and Edmund Stanley, Spondon, near Derby, England, assignors to Celanese Corporation of America, a corporation of Delaware No Drawing. Application September 9, 1937, Serial No. 163,094. In Great Britain September 19, 1936

10 Claims. (Cl. 91—68)

This invention relates to the treatment of textile and like materials, and is particularly concerned with the waterproofing of such materials and with compositions suitable for this purpose.

The compositions of the invention are dispersions containing rubber and a wax. Waterproof finishes produced by means of these dispersions are of considerably improved resistance to washing.

The rubber is preferably used in the form of rubber latex, but artificial dispersions of rubber may also be used, for instance artificial aqueous dispersions of natural rubber and of synthetic rubber produced, for example, from butadiene derivatives. Vulcanised latex may also be employed. Any suitable waxes may be employed in the process of the invention, for instance paraffin wax, Japan wax, carnauba wax, ozokerite, and beeswax.

The waterproofing compositions of the invention may contain pigments, dyestuffs or other effect materials. The rubber latex may contain any suitable stabiliser. Preferably, however, an ammonia stabilised rubber latex is used. It is of advantage to use in dispersing the wax an alkaline dispersing agent such as a water-soluble soap, especially a soap of a volatile base, and it is of particular advantage to form the soap in situ, for example by adding a base such as ammonia to a mixture of the wax with a soap-forming solid fatty acid such as stearic or palmitic acid. Oleic acid is less suitable. The soap may subsequently be decomposed on the treated textile materials by acidifying or, in the case of a soap of a volatile base, by heating and liberating the base. This decomposition of the soap is of importance with a view to obtaining the desired stability to washing.

The following example illustrates the invention:

Example

40–45 kilograms of stearic acid is melted with 60–65 kilograms of paraffin wax. 30–35 litres of ammonia of specific gravity 0.880 are added. The mixture is well stirred to form a dispersion and diluted to about 600 litres with warm water. 54 litres of rubber latex are then added and the whole diluted to 3000 litres.

A knitted fabric of cellulose acetate artificial silk is worked in the solution for about 15 minutes at a temperature between 25 and 35° C. The fabric is then removed from the bath, hydroextracted and dried. During the drying the ammonium stearate formed at an earlier stage is decomposed.

The process of the invention is applicable to textile materials of cotton, silk, wool or other natural fibres or of artificial fibres, for instance of regenerated cellulose produced by the viscose or cuprammonium processes. The invention is, however, of particular importance in connection with materials having a basis of cellulose acetate or other organic derivatives of cellulose, for instance cellulose esters such as cellulose formate, propionate, butyrate, and nitro-acetate, cellulose ethers such as methyl, ethyl and benzyl cellulose, and cellulose ether-esters such as ethyl cellulose acetate and oxyethyl cellulose acetate.

Having described our invention what we desire to secure by Letters Patent is:

1. A knitted fabric containing yarns of an organic derivative of cellulose and having an enhanced resistance to water due to the presence on the material of rubber in intimate admixture with a wax and a solid fatty acid.

2. A knitted fabric containing yarns of cellulose acetate and having an enhanced resistance to water due to the presence on the material of rubber in intimate admixture with a wax and a solid fatty acid.

3. Process for the production of improved textile materials, which comprises increasing the water-resistance of a knitted fabric of an organic derivative of cellulose by impregnating the fabric with a dispersion containing rubber, a wax and a soap which is a salt of a solid fatty acid and a volatile base and subsequently decomposing the soap and liberating the base by heating the treated materials.

4. Process for the production of improved textile materials, which comprises increasing the water-resistance of a knitted fabric of an organic derivative of cellulose by impregnating the fabric with a dispersion containing an ammonia stabilized rubber latex, a wax and a soap which is a salt of a solid fatty acid and a volatile base and subsequently decomposing the soap and liberating the base by heating the treated materials.

5. Process for increasing the water-resistance of knitted fabrics containing organic derivatives of cellulose, which comprises impregnating the fabric with a dispersion containing rubber, a wax and ammonium stearate and subsequently decomposing the ammonium stearate and liberating the base by heating the treated materials.

6. Process for the production of improved textile materials, which comprises increasing the water-resistance of a knitted fabric of an organic derivative of cellulose by impregnating the fabric with a dispersion containing an ammonia stabilized rubber latex, a wax and ammonium stearate and subsequently decomposing the ammonium stearate and liberating the base by heating the treated materials.

7. Process for the production of improved textile materials, which comprises increasing the water-resistance of a knitted fabric of cellulose acetate by impregnating the fabric with a dispersion containing rubber, a wax and a soap which is a salt of a solid fatty acid and a volatile base and subsequently decomposing the soap and liberating the base by heating the treated materials.

8. Process for the production of improved textile materials, which comprises increasing the water-resistance of a knitted fabric of cellulose acetate by impregnating the fabric with a dispersion containing an ammonia stabilized rubber latex, a wax and a soap which is a salt of a solid fatty acid and a volatile base and subsequently decomposing the soap and liberating the base by heating the treated materials.

9. Process for increasing the water-resistance of knitted fabrics containing cellulose acetate, which comprises impregnating the fabric with a dispersion containing rubber, a wax and ammonium stearate and subsequently decomposing the ammonium stearate and liberating the base by heating the treated materials.

10. Process for the production of improved textile materials, which comprises increasing the water-resistance of a knitted fabric of cellulose acetate by impregnating the fabric with a dispersion containing an ammonia stabilized rubber latex, a wax and ammonium stearate and subsequently decomposing the ammonium stearate and liberating the base by heating the treated materials.

GEORGE HOLLAND ELLIS.
EDMUND STANLEY.